United States Patent [19]

Morales

[11] Patent Number: 4,810,313

[45] Date of Patent: Mar. 7, 1989

[54] GOLD SOLDER FLUXING COMPOSITION AND METHOD OF PREPARING THE SAME

[75] Inventor: Mario E. Morales, Newport News, Va.

[73] Assignee: Virginia McReynolds, Newport News, Va. ; a part interest

[21] Appl. No.: 167,339

[22] Filed: Mar. 14, 1988

[51] Int. Cl.$^4$ .............................................. B23K 35/34
[52] U.S. Cl. ...................................... 148/24; 420/35; 420/82; 420/507; 420/511
[58] Field of Search ................... 420/35, 82, 507, 511; 148/24

[56] References Cited

U.S. PATENT DOCUMENTS

| | | | |
|---|---|---|---|
| 1,731,211 | 10/1927 | Davignon | 420/511 |
| 2,229,463 | 1/1941 | Leach | 420/511 |
| 2,340,362 | 2/1944 | Atlee | 250/147 |
| 3,141,238 | 7/1964 | Harman | 29/498 |
| 3,925,066 | 12/1975 | Kohrn | 75/134 C |
| 3,925,073 | 12/1975 | Kohrn | 75/173 C |
| 4,444,719 | 4/1984 | Sakakibara | 420/511 |
| 4,446,102 | 5/1984 | Bales | 420/511 |
| 4,473,621 | 9/1984 | Drylie | 428/576 |

*Primary Examiner*—Peter D. Rosenberg
*Attorney, Agent, or Firm*—Robbins & Robbins

[57] ABSTRACT

A gold solder matching 14 karat yellow gold. The solder is typically employed in jewelry repair and is comprised of discrete particles of gold alloy and a flux to which a small amount of water is added to provide a fluid, liquid-like, easily worked solder. The gold alloy consists essentially of about 45% silver, about 20% copper, about 25% gold and about 10% brass.

8 Claims, No Drawings

GOLD SOLDER FLUXING COMPOSITION AND METHOD OF PREPARING THE SAME

BACKGROUND OF THE INVENTION

In the past there has been a problem in the jewelry art of providing a proper, easily workable solder for repair of gold jewelry. The matching of 14 karat jewelry has been difficult to achieve by goldsmiths in a convenient, easily workable solder.

Such a solder for jewelry repair must meet the criteria of ease in application complete with workability and efficiency in the soldering operation. Gold solders in the past have conventionally been in sheet form requiring cut-off to small pieces, adding a liquid flux and soldering. This is a time consuming and inefficient operation. While various solders have been employed these criteria, with the important aspect of matching the color of 14 karat gold, have represented an area where such an easily applies solder has been a problem to obtain.

SUMMARY OF THE INVENTION

By means of this invention there has been provided a gold solder that may be conveniently used by jewelers or goldsmiths in the repair of fabrication of 14 karat yellow gold jewelry. The solder matches the natural color of the 14 karat yellow gold and significantly improves the appearance of the soldered fabrication by avoiding a mismatch in color.

The solder is prepared from a gold alloy that contains a substantially lower gold percentage than the 56-58% of 14 karat yellow gold. When alloy with silver, copper and brass the solder not only matches the color of 14 karat gold, but, when mixed with water and a conventional gold solder flux, may be easily and efficiently applied in the repair as well as the fabrication of 14 karat gold jewelry and the like.

The composition of the gold allow used in the preparation of the gold solder of this invention consists essentially of about 25% gold, about 45% silver, about 20% copper and about 10% brass. The gold alloy is prepared by melting the brass and adding the other components to the melt. The finished gold alloy solder melts at 1100° F.

The gold alloy solder composition, after cooling to a solid, is then comminuted into small discrete particles such as by filing or the like. The filed particles are then prepared in solder form by adding a small amount of a liquid flux such as a conventional gold solder flux having a liquid base of borax or the like. The resultant gold solder is fluid and may be easily worked by a jeweler or goldsmith in soldering 14 karat yellow gold. The soldering god connection closely matches the natural 14 karat yellow gold color and provides an aesthetically pleasing appearance making the soldered connection virtually unnoticeable and not detracting from the appearance of the soldered jewelry.

The gold solder of this invention is simply employed in the normal fashion of gold solder. It may be stored, and upon any loss of moisture, a small amount of additional water may be added to restore it to the proper workability. By virtue of the gold solder being in discrete form, small amounts of the complete gold solder including the added water and liquid flux may be easily handled by solder tools to scoop out a desired amount of the solder to be applied in the soldering operation. The gold solder provided herein furnishes a valuable adjunct to the jeweler's and goldsmith's inventory for jewelry repair.

DESCRIPTION OF THE INVENTION

The gold solder of this invention is prepared from a gold alloy composition that matches the color of yellow 14 karat gold. The composition of the alloy is constituted of gold having a melting point of 1947.97° F., silver having a melting point of 176.47° F., copper having a melting point of 1982.12° F. and brass which is melted at 1620° F.

The composition of the alloy is as follows by weight:
Gold (24 Karat): 25%
Silver: 45%
Copper: 20%
Brass: 10%

If the formula is varied to any substantial extend, the color will not match 14 karat yellow gold. Also, the consistency would be too hard or too soft. With the composition provided the gold alloy provides a true 14 karat yellow gold color in a liquid solder making 14 karat gold chain jewelry soldering easier to accomplish with less labor.

A typical composition of the brass employed is as follows by weight:
Copper: 59.00%
Manganese: 0.04%
Tin: 0.75%
Iron: 0.80%
Silicon: 0.10%
Zinc: Remainder (about 39.31%)

The preparation of the gold solder alloy is effected by melting the brass at 1620° F. and adding to the other components of the alloy set forth above. The finished alloy melts at 1100° F.

After the solder alloy has been prepared as set out above, it is in solid form at room temperature and is comminted such as by filing to provide discrete particles. These particles or filings may, for example, be 40 to 100 mesh. To provide a usable, readily dispensed solder, the solid particles are mixed with a flux and water to provide a fluid, liquid-like solder. Upon drying, it develops to a somewhat "gummy" mass. Only a few drops of water need be added, sufficient to wet the solder, followed by stirring. By the use of conventional jeweler's tools such as picks, probes or spatulas, a small amount of the so prepared solder may be separated and applied as solder to the 14 karat yellow gold being repaired or fabricated. The wetting and application may be visualized as adding water to fine sand and applying wetted particles to the area to be soldered in the amount desired. As water evaporates from the solder composition, more water may be added to keep the solder filings liquid or wetted.

The flux employed is a conventional liquid gold solder flux, for example, Battern's Self-Pickling Flux manufactured by Dixon, William Co., a division of Grobet File Co. of America Inc., of Carlstadt, N.J. Other borax and boric acid base fluxes may also be employed as will be well understood in the art.

The flux is only used in making the gold solder. The flux will evaporate as the jeweler or goldsmith uses it. Then, to keep the fillings liquid or wetted, a small amount of water, such as a few drops or so, is added with stirring.

The so prepared solder is simply and easily employed with conventional jeweler's tools in a standard soldering operation using the normal techniques of the trade.

Thus, using a flat tipped rod the desired amount of solder may be placed on top of the area to be soldered. Using a quick flame at first, the flame is eased on the solder until the hottest part of the flame is on the area to be soldered. This application is continued until the solder flow to complete the desired soldered connection, usually taking about a minute.

Various changes and modifications may be made within this invention as will be apparent to those skilled in the art. Such changes and modifications are within the scope and teaching of this invention as defined in the claims appended hereto.

What is claimed is:

1. A gold solder comprised of an alloy and a liquid gold solder flux, said alloy consisting essentially of about 45% silver, about 20% copper, about 10% brass and about 25% 24 karat gold, said solder having a color matching 14 karat yellow gold, said alloy being in the form of small discrete particles and mixed with said flux and water to provide a wetted fluid solder.

2. The gold solder of claim 1 in which the brass has a composition consisting essentially of 59% copper, 0.04% manganese, 0.75% tin, 0.80% iron, 0.10% silicon and about 39.31% zinc.

3. The gold solder of claim 1 in which the discrete particles have a particle size of about 40 to 100 mesh.

4. The gold solder of claim 1 in which the brass has a composition consisting essentially of 59% copper, 0.04% manganese, 0.75% tin, 0.80% iron, 0.10% silicon and about 39.31% zinc, the discrete particles have a particle size of about 40 to 100 mesh and said solder has a melting point of about 1100° F.

5. A method for preparing a gold solder having a color matching 14 karat yellow gold which comprises melting a gold alloy composition consisting essentially of about 45% silver, about 20% copper, about 10% brass and about 25% 24 karat gold, cooling the gold alloy and comminuting to provide small discrete particles of said gold alloy, mixing said particles with a small amount of water and a liquid gold solder flux to provide said gold solder in a wetted liquid form.

6. The method of claim 5 in which the brass has a composition consisting essentially of 59% copper, 0.04% manganaese, 0.75% tin, 0.80% iron, 0.10% silicon and about 39.31% zinc.

7. The method of claim 6 in which the gold alloy is comminuted by filing to a particle size of about 40 to 100 mesh.

8. The method of claim 5 in which the brass is melted at about 1620° F. and the other alloy components are added to provide a gold solder alloy having a melting point of about 1100° F.

* * * * *